Jan. 5, 1943.  H. N. EDENS ET AL  2,307,622
WINDMILL
Filed Nov. 5, 1938  3 Sheets-Sheet 2
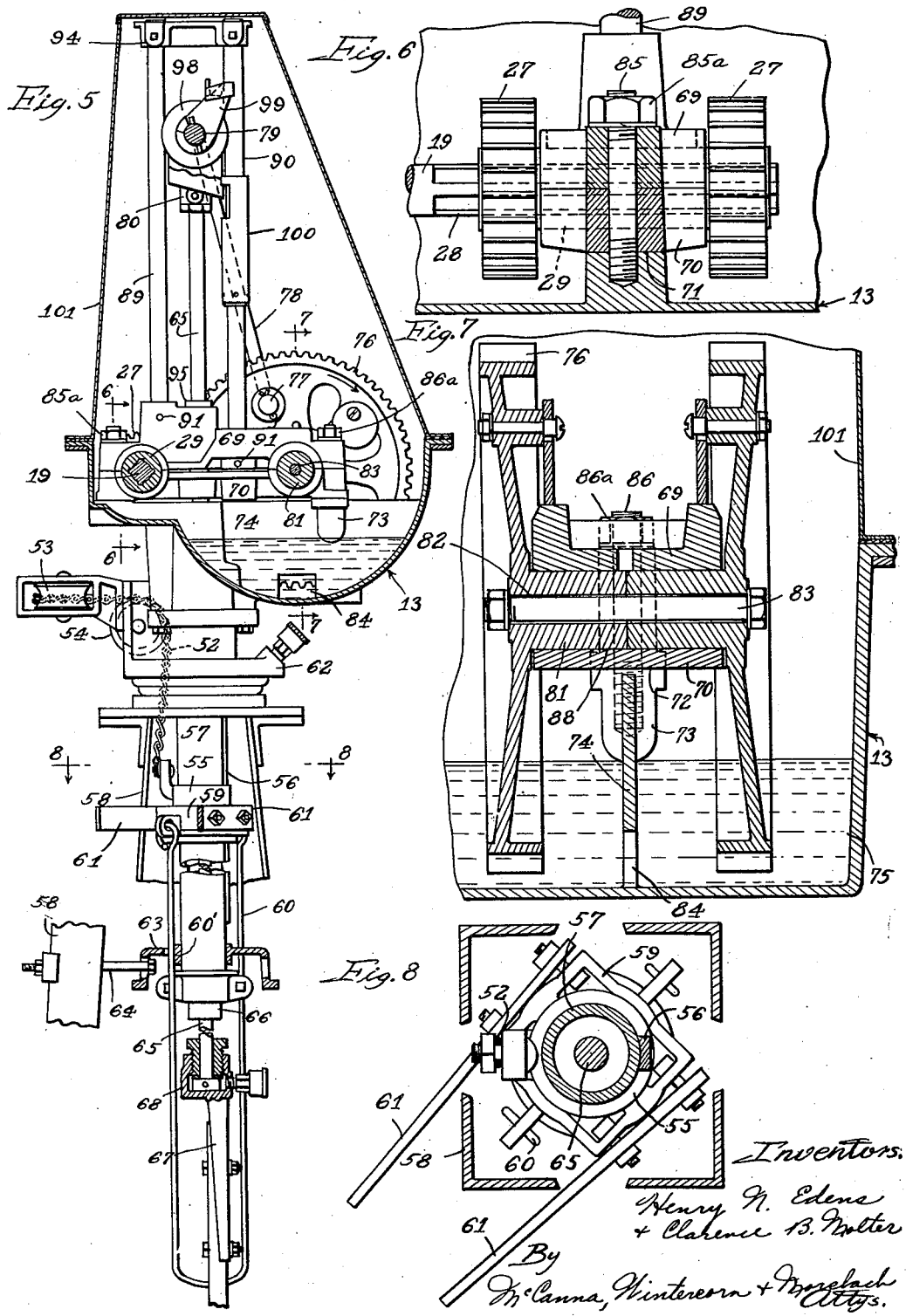

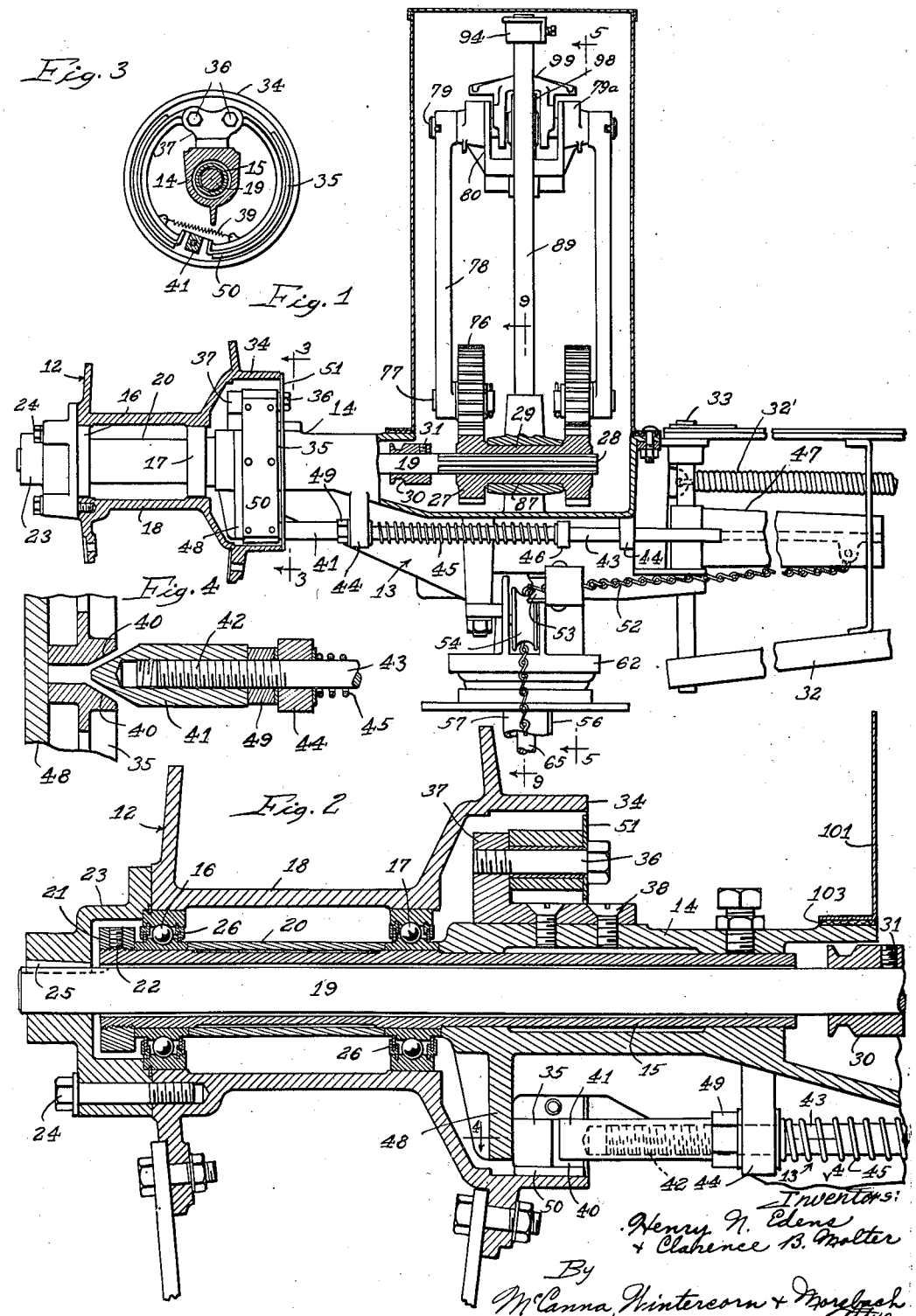
Jan. 5, 1943.  H. N. EDENS ET AL  2,307,622
WINDMILL
Filed Nov. 5, 1938  3 Sheets-Sheet 1

Jan. 5, 1943. H. N. EDENS ET AL 2,307,622
WINDMILL
Filed Nov. 5, 1938 3 Sheets-Sheet 3
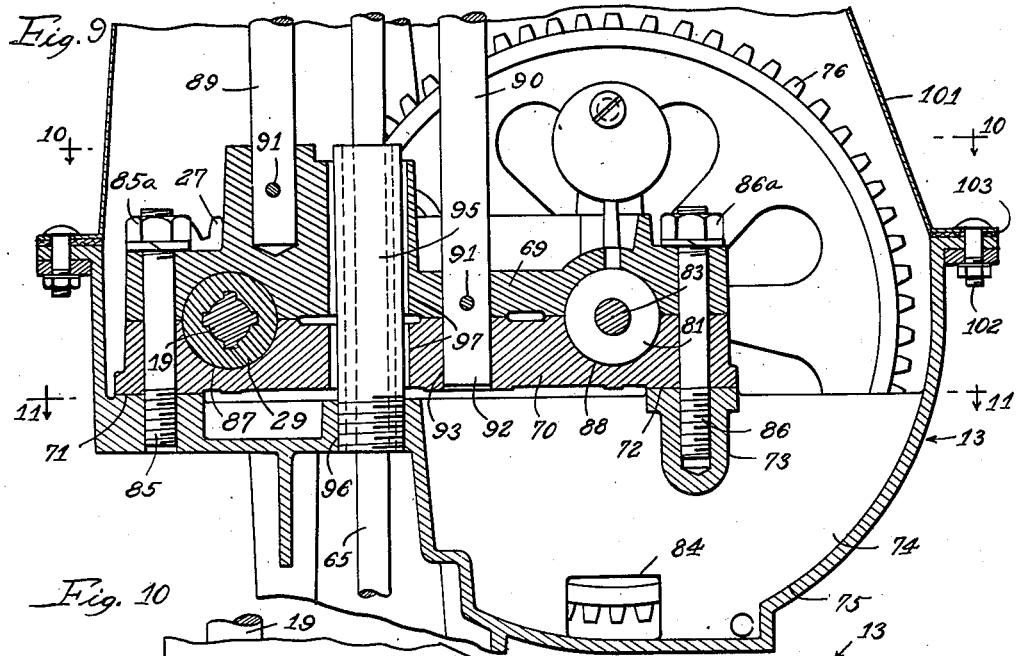
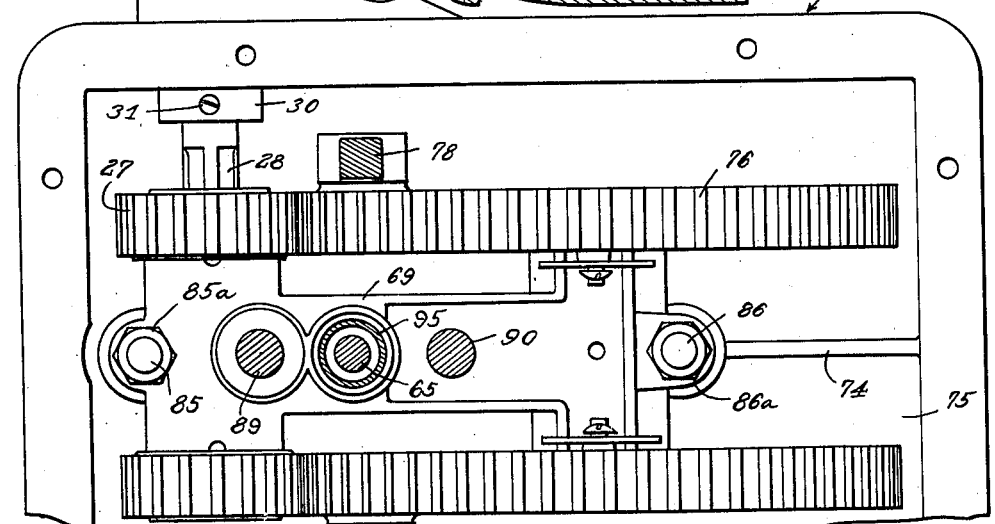
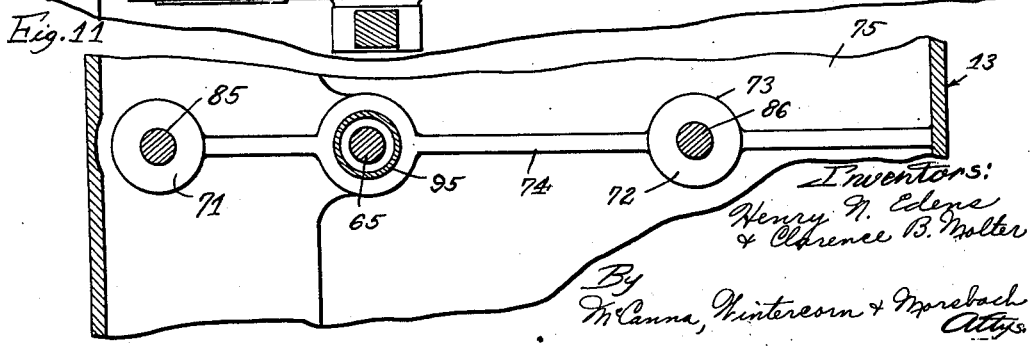
Inventors:
Henry N. Edens
& Clarence B. Nolter
By
McCanna, Wintercorn & Morsbach
Attys Patented Jan. 5, 1943

2,307,622

UNITED STATES PATENT OFFICE 2,307,622

WINDMILL

Henry N. Edens and Clarence B. Molter, Freeport, Ill., assignors to Stover Manufacturing & Engine Co., Freeport, Ill., a corporation of Illinois Application November 5, 1938, Serial No. 238,992

8 Claims. (Cl. 170—79)

This invention relates to windmills.

One of the principal objects of our invention is to provide a windmill the wheel of which has a full floating mounting on an extension from the head independently of the wheel shaft and is arranged merely to transmit drive to said shaft, whereby to provide a windmill:

First, that is safer, because the wheel is definitely insured against accidental dropping, as, for example, in the event the wheel shaft breaks;

Second, that is bound to operate more smoothly and quietly because the wheel bearings can be supplied with lubricant and sealed for the life of the mill, and Third, that is much more convenient to service and repair because internal parts can be removed and replaced without necessitating removal of the wheel—the largest and by far the most cumbersome working part of the mill.

Another important object of our invention is to provide a windmill the head of which is designed so that all of the internal parts can be quickly and easily removed and replaced. For example, when the wheel shaft that is splined for a quickly detachable driving connection with the driving pinions is withdrawn, the driving pinions and driven gears meshed therewith are adapted to be removed by simply loosening two nuts that fasten the gear bearing halves in place in the head, and the upper bearing half carries the guide rods for the cross-head that reciprocates the plunger rod, so that upon removal of the nuts these rods and the cross-head are also removable when the cross-head has been disconnected from the plunger rod. This quickly demountable construction is made possible by the full floating mounting of the wheel, because with that construction the wheel shaft is more or less independent of the wheel and can be withdrawn without disturbing the wheel.

Still another important object of our invention is to provide improved braking means on the extension of the head in operative relation to the inside of a braking flange provided on the wheel, said braking means being of an internal expanding type and arranged to be expanded by movement of a wedge on a rod movable automatically against the action of a return spring by the vane support when the pull-out mechanism is operated.

The invention is illustrated in the accompanying drawings, in which—

Fig. 1 is a view partly in vertical section and partly in side elevation of the head of a windmill embodying our invention, the wind wheel and vane support being shown fragmentarily;

Fig. 2 is an enlarged longitudinal section through the wind wheel portion of Fig. 1;

Figs. 3 and 4 are sectional details on the lines 3—3 and 4—4 of Figs. 1 and 2, respectively;

Fig. 5 is another view of the windmill head partly in side elevation and partly in vertical section in the plane of the line 5—5 of Fig. 1, showing more of the mast and plunger rod, and also showing the novel pull-out device;

Figs. 6 and 7 are sectional details on a larger scale of the drive pinions and driven gears taken on the lines 6—6 and 7—7 of Fig. 5, respectively;

Fig. 8 is a horizontal section on the line 8—8 of Fig. 5, on a larger scale;

Fig. 9 is a section on an enlarged scale on the line 9—9 of Fig. 1, and

Figs. 10 and 11 are horizontal sections on the lines 10—10 and 11—11 of Fig. 9, respectively.

The same reference numerals are applied to corresponding parts throughout the views.

Referring first principally to Figs. 1 and 2, the reference numeral 12 designates the wind wheel on which the usual blades (not shown) are carried for propulsion of the wheel by the wind. 13 is the head of the windmill which has a tubular extension 14 supporting a quill 15 projecting from the tubular extension to mount ball or other anti-friction bearings 16 and 17 on which the hub 18 of the wheel 12 is supported independently of the wheel shaft 19 to which it is arranged to transmit drive. A spacer sleeve 20 is provided on the quill 15 between the bearings 16 and 17 to keep the same in fixed spaced relation, and a nut 21 is threaded on the end of the quill next to the bearing 16 to retain the bearings 16 and 17 between the nut and the end of the tubular head extension 14. A set-screw 22 serves to lock the nut 21 against accidental loosening. A bell-shaped cap or coupling plate 23 is detachably bolted, as at 24, to the hub of the wheel 12 and has a key connection 25 with the outer end of the wheel shaft 19, whereby to transmit drive from the wheel to the shaft, but permit one to withdraw the wheel shaft from the head 13 without disturbing the wheel. In other words, the wheel 12 is on a full floating mounting on the head 13, instead of relying upon the wheel shaft 19 for support. This makes for safety, because the wheel can't drop and cause injury or death to a passerby in the event the wheel shaft, due to a hidden flaw, or due to crystallization, or for other reasons, happens to break. Another advantage is that the bearings 16 and 17 can be of a type having seals, as indicated at 26, for retaining lubricant sufficient for the life of the mill, thus insuring smooth and quiet operation indefinitely without giving the mill any attention. Still another advantage going with the full floating mounting of the wheel is the convenience with which the internal working parts in the head 13 may be removed and replaced without necessitating removal of the wheel, which because of its size and weight usually has to be taken down in sections. The dismounting of the wheel occasioned more difficulties and took more time than any other working part of the mill. With the full floating mounting, the wheel shaft 19 can be withdrawn from its connection with the drive pinions 27 without disturbing the wheel, by merely removing the bolts 24 to disconnect the outer end of the shaft from the wheel, the inner end being splined, as indicated at 28, for a quickly detachable driving connection with the integral journal 29 that joins the pinions 27 together. The pinions 27 and journal 29 are cast in one piece. At the time the wheel shaft is removed, an oil-throwing collar 30 fastened by means of a set-screw 31 to the shaft near its splined end must also be disconnected by loosening the set-screw.

The full floating mounting of the wheel 12 also affords an opportunity to provide simple and effective braking means for stopping the wheel quickly when the vane member 32 pivoted to the head 13 in the usual way, as at 33, is pulled out of the wind through approximately 90° from the position shown in Fig. 1 to a position substantially parallel to the plane of the wheel. The wheel has an annular flange 34 on the inner end of the hub thereof. Two brake band segments 35 are pivoted on bolts 36 on the bracket 37 suitably secured by means of screws 38 onto the outer end of the tubular head extension 14 and are adapted to be expanded into frictional engagement with the inside of the brake flange 34 on the hub of the wheel. A coiled tension spring 39 normally tends to contract the brake band segments, but they have diverging surfaces 40 on their free ends between which a wedge block 41 threadedly adjustable on the threaded end 42 of a push-and-pull rod 43 is adapted to engage. The rod 43 is supported for reciprocation on lugs 44 provided on the head 13 and has a coiled compression spring 45 encircling the same acting between one of the lugs 44 and a collar 46 secured on the rod 43 tending normally to move the rod and the wedge block 41 with it to retracted position. A radius arm 47 pivoted on the same pin 33 with the vane 32 is arranged when operated by the chain 52 connected with the mill's pull-out device to swing the vane so as to force the wind wheel out of the wind. The arm 47 in this operation strikes the end of the rod 43 and forces the wedge block 41 between the brake band segments 35 so as to spread the same apart and exert sufficient braking action to stop the rotation of the wheel promptly. There is a governor tension spring 32' connected to the vane 32 and the mill head 13 tending to move the vane to operating position in the usual way. Thus, when the wind changes direction, the vane moves accordingly to shift the wheel 12 squarely into the wind. The arm 47 moves with the vane only when the latter is swung by operation of the pull-out and it is only under those circumstances that the brake is applied. It is obvious that there is no danger of the brake dragging on the wheel flange prior to actual application of the brake by the arm 47, because the brake band segments are held out of engagement with the flange by spring action and the wedge 41 is actually in spaced relation to the ends of the brake band segments up to the time that the rod 43 is moved by the arm 47. Very little movement is necessary, and the brake is not applied until the vane 32 is nearly parallel with the wheel 12, and that, of course, is of advantage because it reduces the wear on the brake by not having the brake applied until the wheel is swung out of the wind and has lost some of its momentum. There is a vertical wall 48 integral with and depending from the outer end of the tubular head extension 14 which has sliding bearing engagement with the brake band segments 35 and serves to assume the side thrust on said segments when the wedge block 41 forces the ends thereof apart by sliding engagement with their diverging surfaces 40. A take-up adjustment for wear is provided by threading the wedge block on the threaded end 43 of the rod and providing a lock nut 49 behind the block which can be tightened against it to lock it in adjusted position. When the brake band linings 50 become worn, one can still obtain the same braking effect by merely loosening the lock nut 49 and unthreading the rod 43 from the wedge block 41 a few turns and locking it with the lock nut 49. A circular cover plate 51 suitably secured in place by means of bolts 36 serves to exclude dirt and weather from the brake mechanism. This cover plate is removed in Fig. 3 in order to disclose the brake mechanism behind it.

The arm 47 for swinging the vane 32 and applying the brake on the wind wheel is shown as having a chain 52 connected thereto and passed over guide pulleys 53 and 54 for connection outside the mast 57 to the collar 55 keyed slidably, as at 56, to the mast at a point near the upper end of the tower 58. The collar 55 by reason of the key 56 turns with the mast and head 13 so that it does not change its relationship to the pulleys 53 and 54 as the mill head turns. The pull-out swivel 59 is swiveled on the collar 55 and carries a bail 60 to which the rope or chain used in pulling the mill out of the wind is attached. The spaced arms 61 on the swivel 59 project on opposite sides of one of the corner posts of the tower 58 to keep the swivel from turning with the collar 55. This construction is obviously suitable for three or four legged towers. The mill head is supported on the upper end of the tower on a turntable 62, and the mast 57 at a certain distance below the upper end of the tower finds lateral support in a bearing ring 63 suitably secured to the corner posts of the tower by bolts 64. The bail 60 passes freely through holes 60' provided in the ring 63 so that the bail is guided for nearly straight line movement relative to the mast. The plunger rod 65 to which further reference will be made presently is reciprocable in the mast 57 and slides in a guide ring 66 mounted on the lower end of the mast. The rod 65 is therefore isolated from the pull-out and there is avoided the objections present in the old constructions where the pull-out worked through the mast with the plunger rod and the rod often rubbed on parts of the pull-out and the operation of the pull-out was apt to result in bending the plunger rod. At 67 is indicated the sucker rod connection with the plunger rod, the same involving a swivel bearing 68 permitting rotation of the plunger rod with respect to the sucker rod in the usual way.

The full floating mounting of the wheel 12 also is reflected in the changed design of all of the internal working parts of the mill head 13, so that when the wheel shaft 19 is removed, the internal working parts can also be removed quickly. Thus, we provide upper and lower bearing members 69 and 70 which rest on seats 71 and 72 provided beneath the opposite ends thereof in the head 13, the seat 72 being on a boss 73 provided on a vertical partition wall or web 74 in the oil sump 75. This wall or web extends in a median plane between the driven gears 76 that mesh with the drive pinions 27 and carry crank pins 77 for pivotal connection with the lower ends of pitman rods 78 which are pivotally connected at their upper ends on a cross-shaft 79 provided in the cross-head 80 secured to the upper end of the plunger rod 65. The driven gears 76 are also cast and each has a journal portion 81 cast integral therewith with axial holes 82 therethrough for reception of a bolt 83 for fastening the gears together. Such two-piece construction for the driven gears 76 was considered necessary, or at least desirable, because it permits the individual gears to accommodate themselves to their related pinions 27 so as to take care of any minor irregularities in gear teeth and accordingly obtain smoother and quieter operation and less wear. The wall or web 74 has an opening 84 therein so that both gears 76 will at all times operate in oil at the same level. Studs or bolts 85 and 86 project upwardly from the bearing seats 71 and 72 through registering holes in the bearing members 69 and 70 and receive nuts 85a and 86a on their upper ends which when tightened serve to clamp the bearing members rigidly in place. Bearing recesses 87 and 88 are provided in the bearing members near the opposite ends thereof for reception of the journals 29 and 81 supporting the drive pinions 27 and driven gears 76. In addition, the upper bearing member 69 provides support for the lower ends of guide rods 89 and 90, these rods being secured to the bearing member 69 by pins 91, and the rod 90 having a downwardly projecting pilot end portion 92 adapted to enter a pilot hole 93 provided in the lower bearing member 70, both to insure accurate location of the parts and also make for better stability and rigidity of the guide rods. The upper ends of the guide rods 89 and 90 are joined together by a cross-bracket 94 to further rigidify the construction. A stand pipe 95 is threaded at its lower end into a hole 96 in the head 13 and projects freely through registering holes 97 provided therefor in the bearing members 69 and 70 and has the plunger rod 65 extending therethrough. Since the stand pipe extends to an appreciable elevation above the oil level, and is not close enough to any of the working parts carrying oil, there is no danger of oil seepage through this pipe from the head in the operation of the mill. It is believed to be obvious from this description that there is no difficulty whatever in disassembling the internal parts of the mill head whenever some of these parts may require replacement. The removability of the wheel shaft 19 without disturbing the wheel 12 makes possible much more prompt servicing and repair of the mill, because the wheel which is the heaviest part and the most awkward to handle is not disturbed and all of the other parts are small and light, comparatively speaking. It is also quite an advantage to have the internal parts removable mainly by loosening of the two nuts 85a and 86a, because with that construction the workman needs only a wrench and a pair of pliers to do all of the work.

The special construction of the cross-head 80 involving the use of the guide roller 98 working between the guide rods 89 and 90 to assume the side thrust incident to the operation of the cross-head 80 by the pitman rods 78, forms the subject matter of a copending application of Louis W. Bangasser, Serial No. 238,993, filed November 5, 1938, and in that application is also claimed the lubrication system involving the cooperation of an oil scraper 99 with the oiler tube 100 on the guide rod 90 to furnish lubrication for the bearings 79a on the cross-head 80 for the cross-shaft 79. The oiler 100 on each upstroke carries with it sufficient oil to coat the rod 90 so that on each upstroke there is a film of oil which the scraper 99 is adapted to scrape off to feed oil to the cross-shaft bearings. A sheet metal hood 101 encloses the top of the head and is suitably secured by means of bolts 102, and a gasket 103 is also compressed between the flanges on the head and hood to exclude dirt and weather.

It is believed the foregoing description conveys a good understanding of the objects and advantages of our invention. The appended claims have been drawn with a view to covering all legitimate modifications and adaptations.

We claim:

1. In a windmill, the combination of a mill head, a wind wheel, a wheel shaft extending into said head, means providing a driving connection between the wheel and shaft so that the shaft is removable endwise from the head independently of the wheel, means providing bearing support for the wheel on said head and retaining said wheel against axial displacement relative to said head independently of said shaft, and pump gearing in the head having detachable driving connection with the shaft for operation thereby.

2. In a windmill, the combination of a mill head provided with an extension, a wind wheel having a hub portion, a wheel shaft in said head projecting through said extension, pump gearing in the head having a slidably detachable driving connection with the shaft for operation thereby, spaced anti-friction bearings and spacing means therefor on said extension within the wheel hub for supporting said wheel and holding the same against axial movement independently of said shaft, a retaining nut on said extension preventing displacement of the bearings and spacing means therefrom, and a bell-shaped cap enclosing said nut and having a driving connection with the outer end of said wheel shaft and detachably connected to the adjacent portion of the hub of said wheel.

3. In a windmill, the combination of a mill head having a hollow extension, a wind wheel, a wheel shaft projecting from said head through said extension, said shaft adapted to be removed from the head independently of the wheel, pump gearing in said head detachably operatively connected with said shaft for operation thereby, means providing bearing support for said wheel on said mill head extension serving to retain the wheel against axial displacement relative to the head independently of said shaft, means providing a detachable driving connection between the outer end of said shaft and said wheel on the outer side thereof relative to the head, said wheel having a circular brake flange on the inner side thereof surrounding the mill head extension, and braking means on a support rigid with said mill head extension disposed in operative relation to said flange independently of removal of said wheel shaft.

4. In a windmill, a mill head having a tubular extension, a wind wheel, means providing bearing support for said wheel on said extension independently of its associated wheel shaft, whereby it is separately supported on and retained against displacement from said extension independently of the wheel shaft, pump gearing removably mounted in said head, bearings therefor demountably supported in said head, and a wheel shaft extending from said head through said extension and having a detachable connection at one end with the pump gearing and having a detachable connection at its other end with the wind wheel to transmit drive from said wheel to said gearing, said shaft being removable from the head without disturbing the wheel and said pump gearing being removable upon removal of said shaft.

5. In a windmill, the combination of a head, a driven element extending downwardly therefrom, said head having a laterally extending tubular portion with a reduced tubular extension on the outer end thereof, a wind wheel rotatably supported on said reduced tubular extension independently of its associated wheel shaft, means removably secured on the outer end of said reduced tubular extension for retaining said wheel against displacement therefrom independently of the wheel shaft, a wheel shaft extending through said reduced tubular extension and tubular portion into said head and having a detachable driving connection therein with the aforesaid driven element, and means detachably connecting the outer end of said wheel shaft with the wheel independently of the wheel retaining means.

6. In a windmill comprising a mill head having a hollow extension, a wind wheel in concentric relation with said extension, a wheel shaft extending from the head through said extension and operatively connected with the wind wheel, and a vane pivotally mounted on a vertical axis on said head on the opposite side thereof from the wheel, braking means for said wheel comprising a circular brake flange on the inner side thereof surrounding the mill head extension, a wall on said mill head extension normal to the axis of said wheel shaft and enclosed within said brake flange, internal expanding type brake band segments enclosed by said flange and pivotally supported at one end on and slidably engaging that side of said wall facing the mill head, spring means normally urging said brake band segments to contracted relationship out of engagement with said flange, said brake band segments having spaced free end portions slidably engaging the aforesaid wall on their inner sides and having diverging cam surfaces provided thereon on the outer side toward the mill head, and means for operating said brake band segments comprising a spring retracted push rod disposed substantially parallel to the wheel shaft and guided on said head for endwise movement toward and away from the free ends of said brake band segments and having a wedge member adjustably threadedly mounted on the end thereof with its wedge end arranged to work between the diverging cam surfaces on said brake band segments, said push rod having its other end arranged to be engaged and moved when the vane is swung toward parallelism with the wind wheel.

7. In a windmill, the combination of a mill head provided with an extension, a wind wheel having a hub portion, a wheel shaft in said head projecting through said extension, pump gearing in the head having a slidably detachable driving connection with the shaft for operation thereby, anti-friction bearing means therefor on said extension within the wheel hub supporting said wheel independently of said shaft, a retaining nut on said extension preventing displacement of the wheel and bearing means from said extension independently of said shaft, and a coupling plate on the outer end of said shaft and turning therewith and detachably connected to the adjacent portion of said wheel hub.

8. In a windmill, the combination of a mill head provided with an extension, a wind wheel having a hub portion rotatable on the extension, a wheel shaft in said head projecting through said extension, pump gearing in the head having a slidably detachable driving connection with the shaft for operation thereby, a retaining nut on said extension preventing displacement of the wheel from said extension independently of said shaft, and a coupling plate on the outer end of said shaft and turning therewith and detachably connected to the adjacent portion of said wheel hub.

HENRY N. EDENS.
CLARENCE B. MOLTER.